United States Patent
Pollino et al.

(10) Patent No.: US 11,866,582 B2
(45) Date of Patent: Jan. 9, 2024

(54) PHOTOCURABLE POLYMERS, PHOTOCURABLE POLYMER COMPOSITIONS AND LITHOGRAPHIC PROCESSES INCLUDING THE SAME

(71) Applicant: Solvay Specialty Polymers USA, LLC, Alpharetta, GA (US)

(72) Inventors: Joel Pollino, Johns Creek, GA (US); Stéphane Jeol, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 17/388,458

(22) Filed: Jul. 29, 2021

(65) Prior Publication Data
US 2022/0002545 A1 Jan. 6, 2022

Related U.S. Application Data

(62) Division of application No. 16/091,421, filed as application No. PCT/EP2017/057925 on Apr. 4, 2017, now abandoned.

(60) Provisional application No. 62/319,936, filed on Apr. 8, 2016.

(51) Int. Cl.
| | |
|---|---|
| *C08L 81/06* | (2006.01) |
| *B29C 64/106* | (2017.01) |
| *C08G 75/23* | (2006.01) |
| *B29C 64/124* | (2017.01) |
| *B33Y 70/10* | (2020.01) |
| *B29C 64/135* | (2017.01) |
| *B33Y 10/00* | (2015.01) |

(52) U.S. Cl.
CPC ............ *C08L 81/06* (2013.01); *B29C 64/106* (2017.08); *B29C 64/124* (2017.08); *B29C 64/135* (2017.08); *B33Y 70/10* (2020.01); *C08G 75/23* (2013.01); *B33Y 10/00* (2014.12); *C08G 2650/40* (2013.01)

(58) Field of Classification Search
CPC ...... C08G 2261/516; C08G 2261/1452; C08G 2261/722; C08G 18/0828; C08G 75/23; C08G 75/20; H01B 1/122; H01M 8/1025; H01M 8/1027; C08L 81/06
See application file for complete search history.

(56) References Cited

U.S. PATENT DOCUMENTS

| | | | | |
|---|---|---|---|---|
| 4,562,243 | A * | 12/1985 | Percec | C08G 75/02 528/212 |
| 6,437,080 | B1 * | 8/2002 | McGrail | C08G 75/23 528/495 |
| 2007/0207361 | A1 * | 9/2007 | Yamashita | H01M 8/1025 429/492 |
| 2018/0104891 | A1 * | 4/2018 | Bruggeman | B29C 64/118 |

* cited by examiner

*Primary Examiner* — Shane Fang
(74) *Attorney, Agent, or Firm* — Osha Bergman Watanabe & Burton LLP

(57) ABSTRACT

The present invention relates to functionalized poly(aryl ether sulfones) polymers. The invention further relates to polymer compositions including the functionalized poly(aryl ether sulfone) polymers. Still further, the invention relates to lithographic methods to form three-dimensional (3D) objects that incorporate the aforementioned polymer compositions.

16 Claims, 1 Drawing Sheet

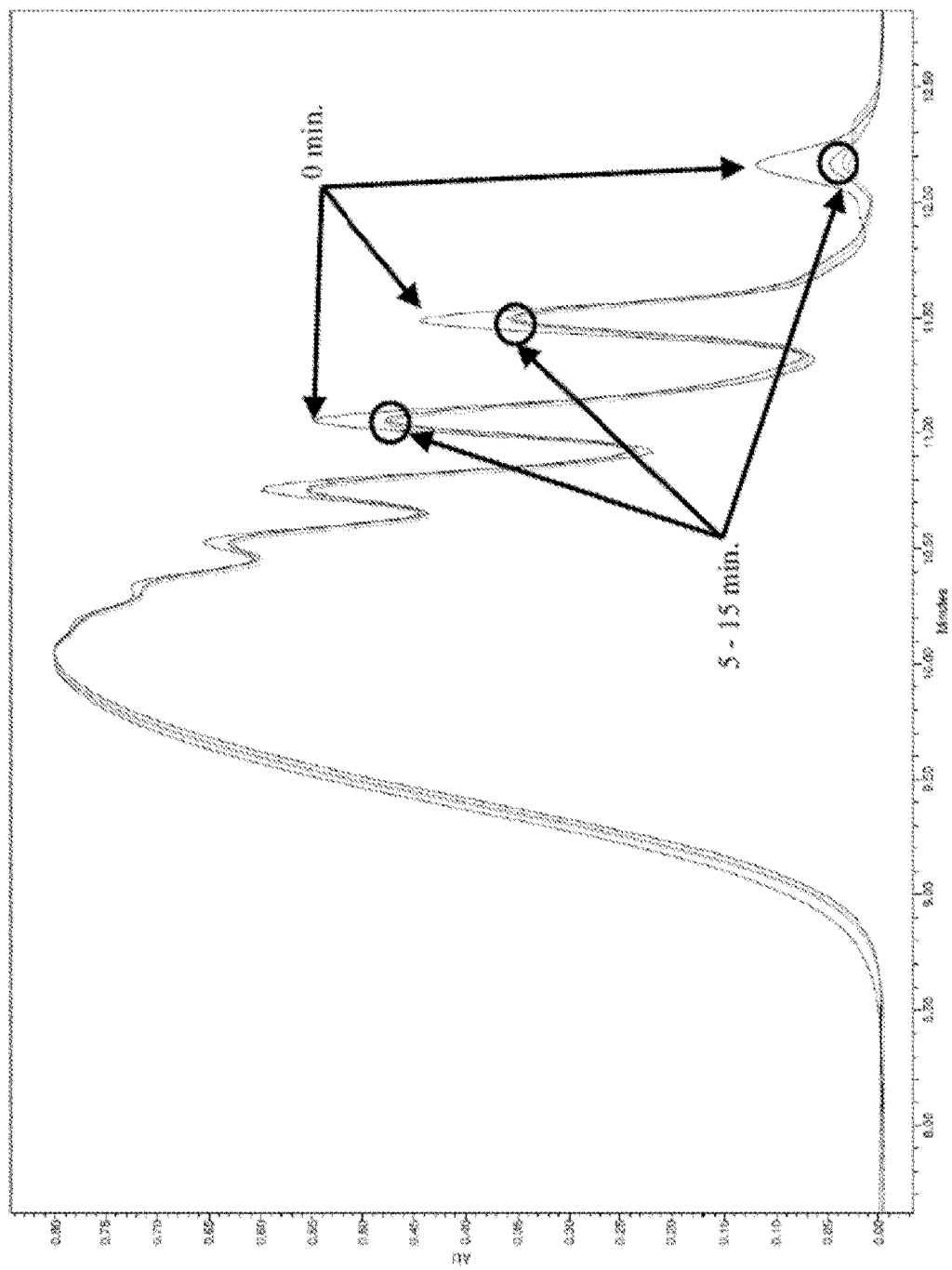

PHOTOCURABLE POLYMERS, PHOTOCURABLE POLYMER COMPOSITIONS AND LITHOGRAPHIC PROCESSES INCLUDING THE SAME

RELATED APPLICATION

The present application is a divisional application of U.S. application Ser. No. 16/091,421, filed on Oct. 4, 2018, which is a U.S. national stage entry under 35 U.S.C. § 371 of International Application No. PCT/EP2017/057925 filed on Apr. 4, 2017, which claims priority to U.S. provisional application No. 62/319,936 filed Apr. 8, 2016.

TECHNICAL FIELD

The present invention relates to functionalized poly(aryl ether sulfones) polymers. The invention further relates to polymer compositions including the functionalized poly (aryl ether sulfone) polymers. Still further, the invention relates to lithographic methods to form three-dimensional (3D) objects that incorporate the aforementioned polymer compositions.

BACKGROUND ART

Polymer compositions are commonly used to manufacture articles for the automotive and aerospace industries, for example as engine parts, as well as in the healthcare industry, for example as implantable devices and dental prostheses. These articles have to present good mechanical properties after fabrication, but they also have to retain a sufficient percentage of these properties over time, notably at their temperature of use (sometimes as high as 150° C.).

Lithographic process for the photofabrication of three-dimensional (3D) articles from polymeric materials have found recent popularity due to their relative speed and simplicity. In general, lithographic processes involve the use of light, for example UV irradiation, to locally cure a polymerizable composition at specific locations. The localized curing allows for the fabrication of 3-dimensional articles.

Lithographic processes generally use polymerizable compositions that are liquid in order to obtain parts with a good resolution. Polymerizable compositions that are liquid are room temperature are easier to use in a printing process, but they generally lead to articles having moderate mechanical properties and thermal stability.

Certain polymers present a better mechanical property profile, but they need to be melt above their melting temperature to be used in lithographic processes. Additionally, these polymers not only need to be reactive in the printing process, when irradiating the layer of polymer, but they also need to be sufficiently thermally stable at temperatures required to melt the polymers.

There is a need for polymerizable polymers and compositions to be used in lithographic processes which are the capable of producing 3D articles that present good mechanical properties after photofabrication and a substantial retention of these mechanical properties after exposure to high temperature, for example above 150° C. There is also a need for polymerizable polymers and compositions well-suited for high temperature 3D printing processes, notably that are thermally stable at temperatures required to melt the polymers.

SUMMARY OF THE INVENTION

The present invention relates to a functionalized poly(aryl ethersulfone) (PAES) polymer. This polymer can be for example used in photofabrication processes. In particular, the PAES polymer and polymer compositions of the present invention, can be incorporated into lithographic processes in which light is used to cure the functionalized PAES polymers.

The applicant has found out that such functionalized PAES polymer and the compositions incorporating such functionalized PAES polymer can effectively used in 3D printing lithographic processes. They can be turned into a liquid state at a temperature below or above the Tg of the functionalized PAES without noticeable change and then cured by irradiation of UV light, producing high thermal properties materials having high Tg, high mechanical properties and high thermal stability.

The present invention also relates to a polymer composition incorporating such functionalized PAES polymer. The composition may further comprises a component selected from the group consisting of reinforcing agents, photoinitiators, tougheners, plasticizers, colorants, pigments, antistatic agents, dyes, lubricants, thermal stabilizers, light stabilizers, flame retardants, nucleating agents and antioxidants.

The present invention also relates to a method for manufacturing a three-dimensional (3D) article with an additive manufacturing system, comprising:
 providing a polymer composition (C) as above-described,
 printing layers of the three-dimensional (3D) article from the polymer composition.

According to an embodiment, the polymer composition (C) is heated to a temperature of at least 280° C. before printing.

According to an embodiment of the present invention, the step of printing comprises irradiating the polymer composition with UV light. The UV light can for example be laser light.

The present invention also relates to three-dimensional (3D) article obtainable, at least in part, by the method described above, and the use of the poly(aryl ethersulfone) (PAES) polymer or of the polymer composition (C), for the manufacture of three-dimensional (3D) objects.

BRIEF DESCRIPTION OF DRAWINGS

The FIGURE is a plot of the elution time vs intensity for the functionalized PPSU polymer of example 1, before and after exposure to various temperatures and times.

DISCLOSURE OF INVENTION

The present invention relates to a functionalized poly(aryl ethersulfone) (PAES) polymer. This polymer can for example be used in photofabrication processes. In particular, the PAES polymer and polymer compositions of the present invention can be incorporated into lithographic processes in which light is used to cure the functionalized PAES polymers.

The PAES polymer of the present invention is functionalized with a functional group, which is an alpha-olefin of formula $CH_2=CH-CH_2-(CH_2)_n-$ wherein n varies between 1 and 10. Alpha-olefin functional groups are introduced as a postpolymerization modification at at least one end of the polymer chain, for example at both ends of the polymer chain, and/or into side chains of the polymer backbone.

More precisely, the PAES polymer of the present invention is functionalized at at least one end of the PAES polymer chain, as a "terminal functionalization". The PAES polymer of the present invention can be functionalized at both ends of the PAES polymer chain. The PAES polymer of the present invention can also be functionalized within the polymer backbone, as a "internal functionalization". For example, with respect to internal functionalization, one or more of the recurring units of the PAES polymer that are not disposed at the end of the PAES polymer chain can be functionalized with a functional group, which is an alpha-olefin of formula $CH_2=CH-CH_2-(CH_2)_n-$ wherein n varies between 1 and 10.

The PAES polymer of the present invention comprises:

at least recurring units ($R_{PAES}$) of formula (L):

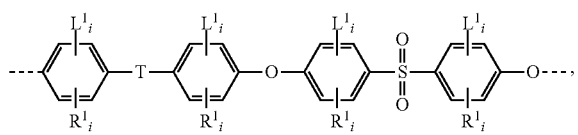

at least one terminal group of formula (M):

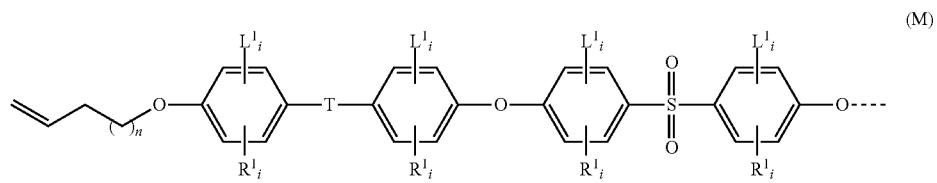

wherein:
each $R^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each $L^1$ is $-X-(CH_2)_n-CH_2-CH=CH_2$ with X being a bond, an aromatic ring, $-O-$, $-CONH-$, $-COO-$ or $-CO-$;
each i is an independently selected integer from 0 to 4;
n is an integer from 1 to 10;
T is selected from the group consisting of a bond, $-CH2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R_aC=CR_b-$, where each $R_a$ and $R_b$, independently of one another, is a hydrogen or a C1-C12-alkyl, C1-C12-alkoxy, or C6-C18-aryl group; $-(CH_2)_m-$ and $-(CF_2)_m-$ with m being an integer from 1 to 6; an aliphatic divalent group, linear or branched, of up to 6 carbon atoms; and combinations thereof.
According to an embodiment, i is zero for each R. In other words, according to this embodiment, the recurring units ($R_{PAES}$) are units of formula (L'):

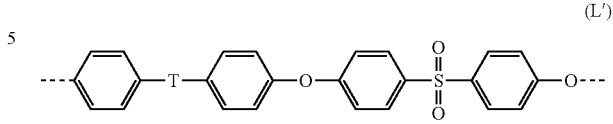

or/and at least one terminal functionalization is according to formula (M'):

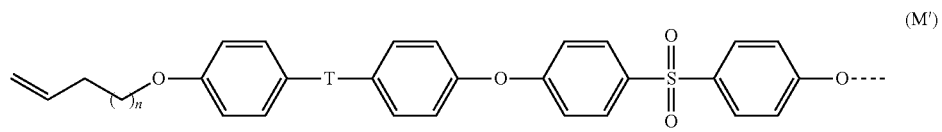

wherein T and n are as above-mentioned.

According to an embodiment, the PAES polymer of the present invention comprises at least 50 mol. % (based on the total number of moles in the polymer) of recurring units of formula (L) or formula (L') and comprises at least one at least one terminal group of formula (M) or formula (M').

According to an embodiment of the present invention, at least 60 mol. %, at least 70 mol. %, at least 80 mol. %, at least 90 mol. %, at least 95 mol. %, at least 99 mol. % (based on the total number of moles in the polymer) or all of the recurring units in the PAES are recurring units ($R_{PAES}$) of formula (L) or formula (L').

According to an embodiment of the present invention, the PAES polymer is such that T is selected from the group consisting of a bond, $-SO_2-$ and $-C(CH_3)_2-$.

According to another embodiment of the present invention, the PAES polymer comprises at least 50 mol. % (based on the total number of moles in the polymer) of recurring units selected from the group consisting of formulas:

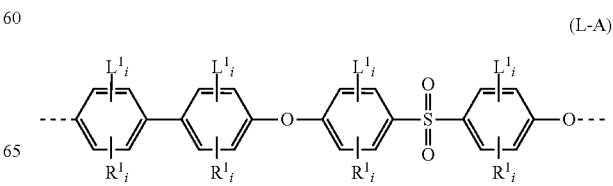

-continued (L-B)

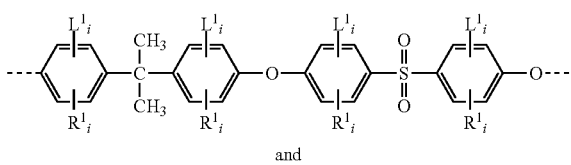

and (L-C)

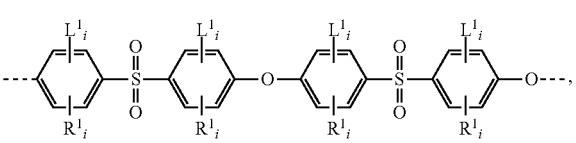

wherein $R^1$, $L^1$ and i are as above-mentioned.

According to this embodiment, at least 60 mol. %, at least 70 mol. %, at least 80 mol. %, at least 90 mol. %, at least 95 mol. %, at least 99 mol. % (based on the total number of moles in the polymer) or all of the recurring units in the PAES are recurring units ($R_{PAES}$) of formula (L-A), formula (L-B) and/or formula (L-C).

According to an embodiment, the functionalized poly(aryl ether sulfone) (PAES) is a functionalized poly(biphenyl ether sulfone) (PPSU).

For the purpose of the present invention, a poly(biphenyl ether sulfone) (PPSU) denotes any polymer comprising:

at least 50 mol. % of the recurring units are recurring units ($R_{PPSU}$) of formula (L-A):

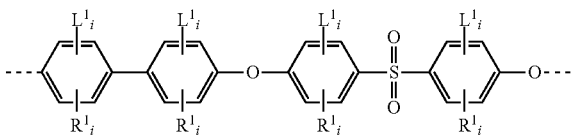

(the mol. % being based on the total number of moles in the polymer), and at least one terminal group of formula (M-A):

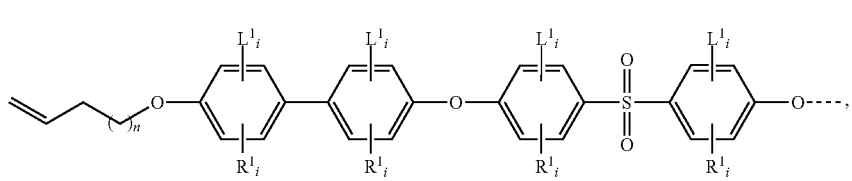

wherein $R^1$, $L^1$, n and i are as above-mentioned.

The PPSU polymer of the present invention can be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L-A).

When the poly(biphenyl ether sulfone) (PPSU) is a copolymer, it can be made of recurring units ($R^*_{PPSU}$), different from recurring units ($R_{PPSU}$), such as recurring units of formula (L-B), (L-C) and/or (L-D):

(L-B)

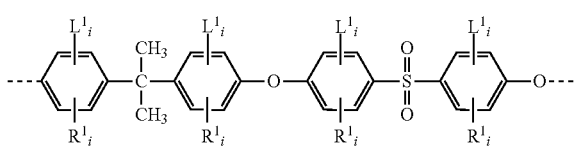

(L-C)

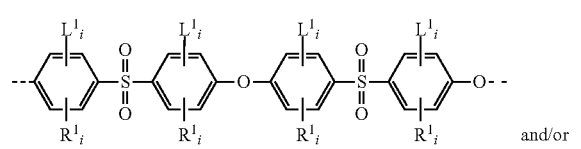

and/or (L-D)

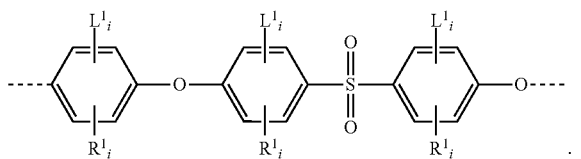

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone in presence of a base. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group. The PPSU is then modified after polymerisation to introduce the functional group at at least one end of the polymer chain. The functional group is an alpha-olefin of formula $CH_2=CH-CH_2-(CH_2)_n-$ wherein n varies between 1 and 10. Alpha-olefin functional groups can also be introduced at both ends of the polymer chain, and/or into side chains of the polymer backbone.

According to an embodiment, the functionalized poly(aryl ether sulfone) (PAES) is a functionalized polysulfone (PSU).

For the purpose of the present invention, a polysulfone (PSU) denotes any polymer comprising:

at least 50 mol. % of the recurring units are recurring units ($R_{PSU}$) of formula (L-B):

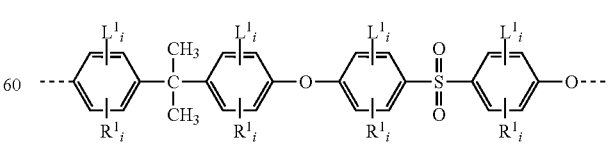

(the mol. % being based on the total number of moles in the polymer), and at least one terminal group of formula (M-B):

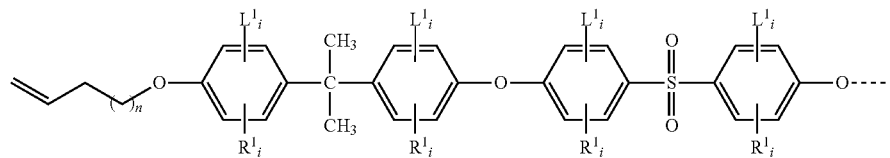

wherein $R^1$, $L^1$, n and i are as above-mentioned.

The PSU polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (L-B).

When the poly(biphenyl ether sulfone) (PSU) is a copolymer, it can be made of recurring units ($R^*_{PSU}$), different from recurring units ($R_{PSU}$) such as recurring units of formula (L-A), (L-C) and/or (L-D):

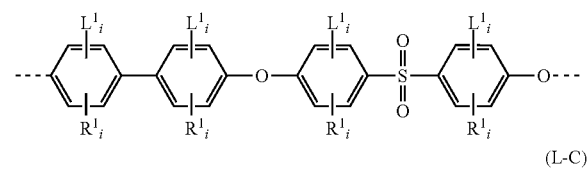 (L-A)

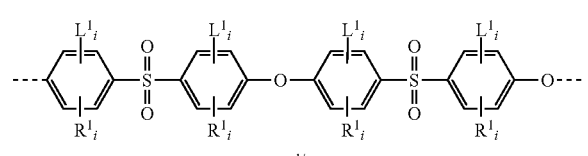 (L-C)

and/or

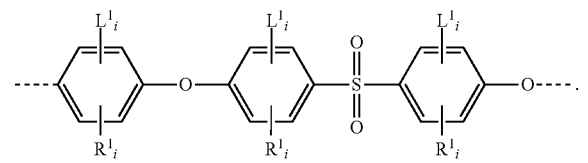 (L-D)

According to an embodiment, the functionalized polyaryl ether sulfone (PAES) is a functionalized polyethersulfone (PESU).

For the purpose of the present invention, a polyethersulfone) (PESU) denotes any polymer comprising:

at least 50 mol. % of the recurring units are recurring units ($R_{PESU}$) of formula (L-C):

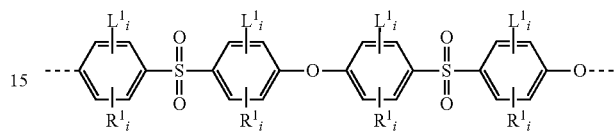

(the mol. % being based on the total number of moles in the polymer), and at least one terminal group of formula (M-C):

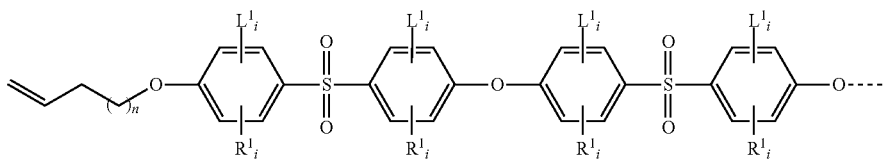

wherein $R^1$, $L^1$, n and i are as above-mentioned.

The PESU polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PESU are recurring units ($R_{PESU}$) of formula (L-C).

When the polyethersulfone (PESU) is a copolymer, it can be made of recurring units ($R^*_{PESU}$), different from recurring units ($R_{PESU}$), such as recurring units of formula (L-A), (L-B) and/or (L-D):

(L-A)

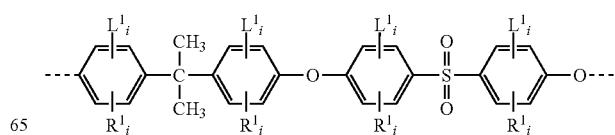

(L-B)

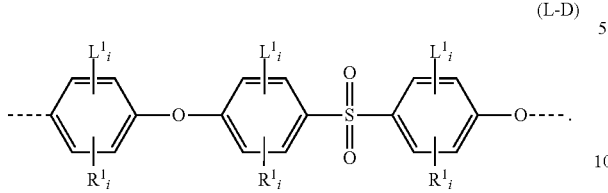

(L-D)

According to an embodiment, the PALS polymer of the present invention has a number average molecular weight (Mn) of less than about 25,000 g/mol, less than about 15,000 g/mol, or less than about 10,000 g/mol, as measured by gel permeation chromatography (GPC) using methylene chloride as a mobile phase, with polystyrene standards.

According to an embodiment, the PAES polymer of the present invention has a number average molecular weight (Mn) of no less than about 1,000 g/mol or no less than about 2,000 g/mol, as measured by gel permeation chromatography (GPC) using methylene chloride as a mobile phase, with polystyrene standards.

The number average molecular weight (Mn) of PAES, for example PPSU, PESU and PSU, can be determined by gel permeation chromatography (GPC) using methylene chloride as a mobile phase (2×5μ mixed D columns with guard column from Agilent Technologies; flow rate: 1.5 mL/min; injection volume: 20 μL of a 0.2 w/v % sample solution), with polystyrene standards.

More precisely, the number average molecular weight (Mn) can be measured by gel permeation chromatography (GPC), using methylene chloride as the mobile phase. In the experimental part, the following method was used: two 5p mixed D columns with guard column from Agilent Technologies were used for separation. An ultraviolet detector of 254 nm was used to obtain the chromatogram. A flow rate of 1.5 ml/min and injection volume of 20 μL of a 0.2 w/v % solution in mobile phase was selected. Calibration was performed with 12 narrow molecular weight polystyrene standards (Peak molecular weight range: 371,000 to 580 g/mol).

According to another embodiment, the poly(aryl ethersulfone) (PAES) polymer of the present invention comprises:

recurring units ($R_{PAES}$) of formula (L):

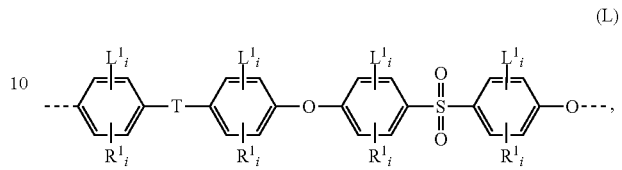

(L)

at least one terminal group of formula (M):

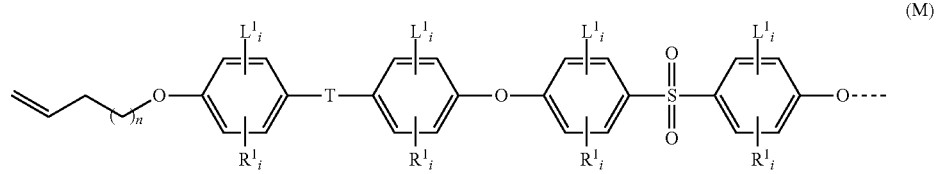

(M)

wherein:
  $R^1$, i and T are as above-described,
  each $L^1$ is —$(CH_2)_n$—$CH_2$—$CH$=$CH_2$ or a radical containing the same;
  n is an integer equals to 1, 2, 3, 4, 5, 6, 7, 8, 9 or 10.

According to another embodiment, n in formula (M) or (M') is 1 and $L^1$ is —$CH_2$—$CH_2$—$CH$=$CH_2$ or a radical containing the same.

Composition (C)

The composition (C) of the present invention comprises the PAES polymer as above-described. The composition may also further comprise at least one component selected from the group consisting of reinforcing agents, photoinitiators, plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers. Mention can be made notably of polyaryletherketones (PAEK) or other polyamides (e.g. polyphthalamides).

The composition (C) of the present invention is preferably liquid at a temperature above 200° C., above 250° C., or even above 280° C.

Reinforcing Agents

The composition (C) may comprises reinforcing agents, for example from 1 to 30 wt. %, based on the total weight of the composition (C).

The reinforcing agents, also called reinforcing fibers or fillers, may be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may for example be present in the composition (C) in an amount ranging between 1 and 30 wt. %, for example between 2 and 25 wt. %, based on the total weight of the polymer composition (C).

Photoinitiator

The composition (C) may comprises at least one photoinitiator, for example from 1 to 30 wt. %, based on the total weight of the composition (C).

Examples of radical photoinitiators include, but are not limited to, acetophenone, acetophenone benzyl ketal, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanethone compounds, 2-methyl-1-[4-(methylthio)phenyl]-2-morpholino-propan-2-one, 2-benzyl-2-dimethylamino-1-(4-morpholinophenyl)-butan-1-one, triphenylamine, 2,4,6-trimethylbenzoyldiphenylphosphine oxide, bis(2,6-dimethoxybenzoyl-2,4,4-trimethylpentylphosphine oxide, benzyl dimethyl ketal, 1-hydroxycyclohexylphenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 3-methylacetophenone, 3,3',4,4'-tetra(t-butylperoxycarbonyl)benzophenone (BTTB), combinations of BTTB and dyesensitizers such as xanthene, thioxanthene, cumarin, and ketocumarin, and polymers containing these photoinitiators.

The photoinitiators may for example be present in the composition (C) in an amount ranging between 0.05 and 10 wt. %, for example between 0.1 and 2 wt. %, based on the total weight of the polymer composition (C).

Co-Reactants

The composition may also contain molecules or polymers containing one or more —SH groups capable of reacting with the $CH_2=CH-$ groups of the PAES of the invention.

Examples of molecules containing at least two —SH groups are 1,16-Hexadecanedithiol, 1,2-Benzenedimethanethiol, 1,2-Ethanedithiol, 1,3-Benzenedimethanethiol, 1,3-Propanedithiol, 1,4-Benzenedimethanethiol, 1,4-Butanedithiol, 1,5-Pentanedithiol, 1,6-Hexanedithiol, 2,2'-Thiodiethanethiol, 2,3-Dimercapto-1-propanol, 4,4'-Bis(mercaptomethyl)biphenyl and Trimethylolpropane tris(3-mercaptopropionate).

The co-reactants may be present in the composition in a molar ratio —SH/$CH_2=CH-$ of equals to or less than 1, for example less than 0.99 or less than 0.95.

Solvents

The composition may also comprises protic and aprotic polar solvents such as sulfolane, 1,2-dichloromethane, chloroform, chlorobenzene, NMP, DMAc, DMF, DMSO.

The concentration of the solvent may be between 1 to 80 wt. %, based on the total weight of the composition.

According to an embodiment, the composition of the present invention comprise no solvent or comprise a solvent in a quantity not exceeding 1 wt. %, not exceeding 0.5 wt. % or not exceeding 0.1 wt. %.

Preparation of the Composition (C)

The invention further pertains to a method of making the composition (C) as above detailed, said method comprising melt-blending the polymers and the reinforcing agents, optionally any other components or additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Process for Manufacturing a 3D Article

The present invention also relates to a method for manufacturing a three-dimensional (3D) article with an additive manufacturing system, comprising:
  providing a polymer composition (C) as above-described,
  printing layers of the three-dimensional (3D) article from the polymer composition (C).

According to an embodiment, the polymer composition (C) is heated to a temperature of at least 200° C., at least 250° C. or at least 280° C. before printing.

According to an embodiment, the step of printing comprises irradiating the polymer composition (C), for example a layer of such composition (C) deposited onto the printing surface, with UV light. The layer preferably presents a size in the range of 10 μm to 300 μm, for example 50 μm to 150 μm.

The UV light can for example be laser light. The irradiation is preferably of sufficient intensity to cause substantial curing of the polymer composition (C), for example the layer of such composition (C). Also, the irradiation is preferably of sufficient intensity to cause adhesion of the layers of polymer composition (C).

According to another embodiment of the present invention, the method for manufacturing a three-dimensional (3D) article with an additive manufacturing system, comprises the steps of:
  providing a polymer composition (C) as above-described,
  printing layers of the three-dimensional (3D) article from the polymer composition (C) by: a) coating a layer of the composition (C) onto a surface, b) irradiating the layer with UV light, c) coating a layer of the composition (C) onto the former irradiated layer, d) irradiating the layer with UV light and e) repeating steps c) and d) a sufficient number of times to manufacture the 3D article.

Applications

The present invention also relates to the use of the poly(aryl ethersulfone) (PAES) polymer of the present invention or of the polymer composition (C) of the present invention, for the manufacture of three-dimensional (3D) objects/articles.

All of the embodiments described above with respect to the poly(aryl ethersulfone) (PAES) polymer and the polymer composition (C) do apply equally to the use for the manufacture of three-dimensional (3D) objects/articles.

The present invention also relates to 3D objects or 3D articles obtainable, at least in part, from the method of manufacture of the present invention, using the poly(aryl ethersulfone) (PAES) polymer or the polymer composition (C) herein described.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Two functionalized PPSU polymer were prepared, characterized and heated at different temperatures and under different conditions. One of these polymers is according to the invention, the other one is a comparative one with lack of thermal stability.

Molecular Weight (Mn, Mw, Mz and Mz+1)

The molecular weights were measured by gel permeation chromatography (GPC), using methylene chloride as a mobile phase. Two 5μ mixed D columns with guard column from Agilent Technologies were used for separation. An ultraviolet detector of 254 nm was used to obtain the chromatogram. A flow rate of 1.5 ml/min and injection volume of 20 μL of a 0.2 w/v % solution in mobile phase was selected. Calibration was performed with 12 narrow molecular weight polystyrene standards (Peak molecular weight range: 371,000 to 580 g/mol). The number average molecular weight Mn, weight average molecular weight Mw, higher average molecular weight Mz and Mz+1, were reported.

I. Synthesis of the Functionalized PPSU Polymers

Example 1—Synthesis of PPSU with 4-Bromobutene (Invention)

This example demonstrates the synthesis of a functionalized PPSU polymer, more precisely functionalized with two terminal molecules according to the following scheme:

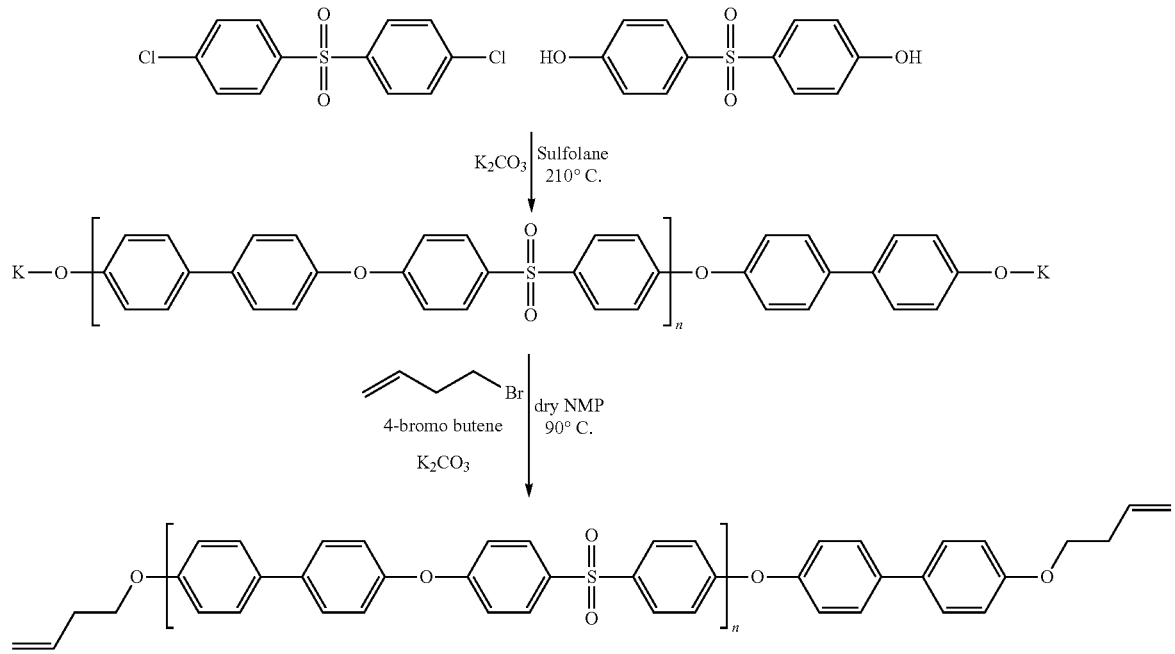

4,4'-dichlorodiphenyl sulfone (82.46 g, 0.287 mol), 4,4'-Biphenol (65.37 g, 0.351 mol), $K_2CO_3$ (50.95 g, 0.369 mol), and sulfolane (345 g) were combined in a 1 L 4-neck reaction vessel equipped with a mechanical stirrer, a Dean-Stark trap (wrapped in insulating cloth), an internal thermometer, and a nitrogen sparge tube. The resulting mixture was then slowly heated with stirring (45 min) to 210° C. and held at that temperature for 3.5 hours. Following build in molecular weight, the reaction mixture was then cooled to 90° C. and diluted with anhydrous NMP (about 230 mL) and $K_2CO_3$ was added (50 g). Following stirring for 15 minutes, 4-bromo-1-butene (112 g, 0.831 mol) was slowly injected via syringe and the resulting mixture was allowed to stir overnight at 100° C. To collect the final polymer, the reaction was further diluted with NMP (120 mL) and subsequently filtered via pressure filtration to remove potassium salts followed by coagulation in a blender using a 50:50 mixture of H₂O:Methanol (2.5 L). The precipitated white solid was then collected via vacuum filtration and repeatedly subjected wash/filtration cycles using water (3×2.5 L) and methanol (1×2.5 L) in a vacuum oven (110° C., 36 mmHg) for 16 hours to yield the final polymer as a white solid.

The Differential Scanning Calorimetry at 20° C./min demonstrated that the final polymer had a $T_g$=134° C. and a $T_m$=242° C. (only seen at the first heat).

Example 2—Synthesis of PPSU with Vinyl Ether (Comparative)

This example demonstrates the synthesis of a functionalized PPSU polymer, more precisely functionalized with two terminal molecules according to the following scheme:

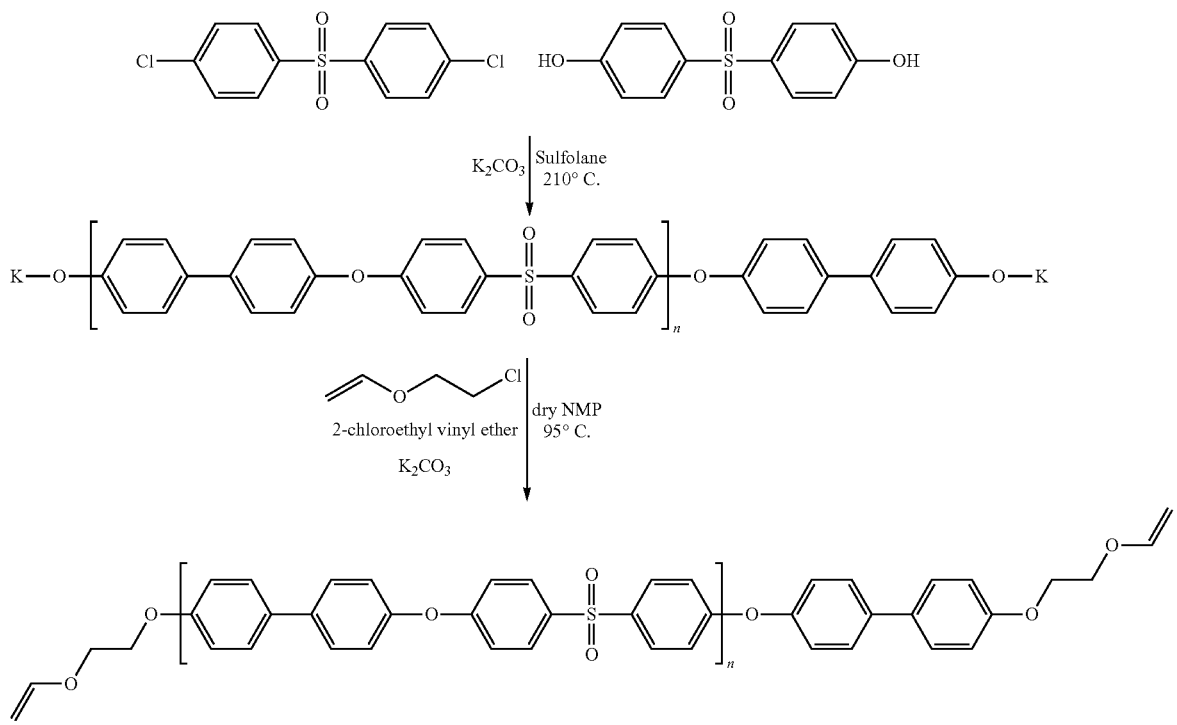

4,4'-dichlorodiphenyl sulfone (7.17 g, 0.025 mol), 4,4'-Biphenol (4.92 g, 0.0264 mol), K₂CO₃ (3.84 g, 0.028 mol), and sulfolane (28 g) were combined in a 200 mL 3-neck reaction vessel equipped with a mechanical stirrer, a Dean-Stark trap (wrapped in insulating cloth), an internal thermometer, and a nitrogen sparge tube. The resulting mixture was then slowly heated with stirring (45 min) to 210° C. and held at that temperature for 3.5 hours. Following build in molecular weight, the reaction mixture was then cooled to 95° C. and diluted with anhydrous NMP (about 20 g) and K₂CO₃ was added (3.83 g). Following stirring for 15 minutes, 2-chloroethyl vinyl ether (1.88 g, 0.0177 mol) was dissolved in anhydrous NMP (about 5 g) and slowly added to the reaction vessel via syringe. The resulting mixture was allowed to stir overnight at 95° C. To collect the final polymer, the reaction was further diluted with NMP (20 g) and subsequently filtered via pressure filtration to remove potassium salts followed by coagulation in a blender using a 50:50 mixture of H₂O:Methanol (0.5 L). The precipitated white solid was then collected via vacuum filtration and repeatedly subjected wash/filtration cycles using water (3×0.5 L) and methanol (1×0.5 L) in a vacuum oven (110° C., 36 mmHg) for 16 hours to yield the final polymer as a white solid.

II. Thermal Stability

1. Under Nitrogen

To demonstrate thermal stability, samples were heated in a DSC pan to noted temperature and isothermally held for 20 min. Cooled to room temperature, samples were removed from pan, dissolved in methylene chloride, and GPC analysis was carried out.

The results are shown in Tables 1 et 2 below:

TABLE 1

| | Example 1 (invention) | | |
| --- | --- | --- | --- |
| | Unheated | Heated to 220° C. for 20 min, under N₂ | Heated to 285° C. for 20 min, under N₂ |
| Mn | 11,022 | 11,202 | 11,059 |
| Mw | 23,429 | 23,956 | 23,551 |
| Mn/Mw | 2.13 | 2.14 | 2.13 |
| Mz | 35,641 | 36,508 | 35,962 |
| Mz + 1 | 47,666 | 48,782 | 48,447 |

TABLE 2

| | Example 2 (comparative) | | |
|---|---|---|---|
| | Unheated | Heated to 220° C. for 20 min, under $N_2$ | Heated to 285° C. for 20 min, under $N_2$ |
| Mn | 13,041 | 15,462 | 14,618 |
| Mw | 26,919 | 32,239 | 32,541 |
| Mn/Mw | 2.06 | 2.09 | 2.23 |
| Mz | 43,801 | 49,216 | 57,583 |
| Mz + 1 | 66,100 | 67,129 | 103,750 |

Comparing the thermal reactivity of the functionalized PPSU of example 1 with that of the functionalized PPSU of comparative example 2 as shown in Tables 1 and 2, the molecular weight of the functionalized PPSU of example 1 does not increase substantially upon exposure to 220° C. or 285° C. whereas the Mn, Mw, Mz, and Mz+1 for the functionalized PPSU of comparative example 2 increases significantly. Such a rise in molecular weight values is consistent with thermally induced chain extension and/or branching brought about by reaction at the terminal vinyl ether moiety. This reactivity of the functionalized PPSU of comparative example 2 demonstrates a lack of thermal stability at temperatures required to melt the polymer, rendering it unsuitable for high temperature SLA 3D printing applications. On contrary, the lack of reactivity demonstrated for the functionalized PPSU of example 1 at temperatures required to melt the polymer, renders it suitable for SLA 3D high temperature printing applications.

2. Under Air

To demonstrate thermal stability of the functionalized PPSU of example 1 under air, samples of the polymer were heated above its melting point and isothermally held at 285° C. for periods ("heating periods") of 0 min, 5 min, 15 min, and 25 minutes in air. Subsequent to each heating period, a GPC analysis was performed on the samples and the resulting data was compared to the un-heat treated samples to check for changes in molecular weight. As shown in the FIGURE, surprisingly, the molecular weight distribution of the heated samples and corresponding curve shape remained constant despite prolonged exposure to high temperatures.

The invention claimed is:

1. A method for making a three-dimensional (3D) article with an additive manufacturing system, the method comprising printing layers of the three-dimensional (3D) article, wherein the layers comprise a polymer composition (C) comprising:
a poly(aryl ethersulfone) (PAES) polymer; and
at least one component selected from the group consisting of reinforcing agents, photoinitiators, tougheners, plasticizers, colorants, pigments, antistatic agents, dyes, lubricants, thermal stabilizers, light stabilizers, flame retardants, nucleating agents and antioxidants;
wherein the poly(aryl ethersulfone) (PAES) polymer comprises:
recurring units ($R_{PAES}$) of formula (L):

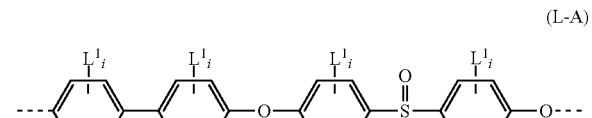

(L)

at least one terminal group of formula (M):

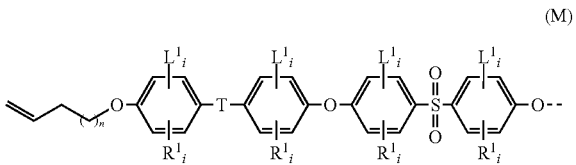

(M)

wherein:
each $R^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each $L^1$ is —$(CH_2)_n$—$CH_2$—$CH$=$CH_2$ or a radical containing the same;
each i is an independently selected integer from 0 to 4;
n is an integer from 1 to 10;
T is selected from the group consisting of a bond, —$CH_2$—; —O—; —$SO_2$—; —S—; —C(O)—; —$C(CH_3)_2$; —$C(CF_3)_2$—; —C(=$CCl_2$)—; —$C(CH_3)(CH_2CH_2COOH)$—; —N=N—; —$R_aC$=$CR_b$—,
where each $R_a$ and $R_b$, independently of one another, is a hydrogen or a C1-C12-alkyl, C1-C12-alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof,
wherein the printing is conducted at a temperature of at least 200° C.

2. The method of claim 1, wherein the method comprises irradiating the polymer composition with UV light.

3. The method of claim 2, wherein the UV light is laser light.

4. The method of claim 1, wherein T is selected from the group consisting of a bond, —$SO_2$— and —$C(CH_3)_2$—.

5. The method of claim 1, wherein the poly(aryl ethersulfone) (PAES) polymer comprises at least 50 mol. % of recurring units of formula (L) based on the total number of moles in the polymer.

6. The method of claim 1, wherein the poly(aryl ethersulfone) (PAES) polymer comprises at least 50 mol. % of recurring units selected from the group consisting of formulas:

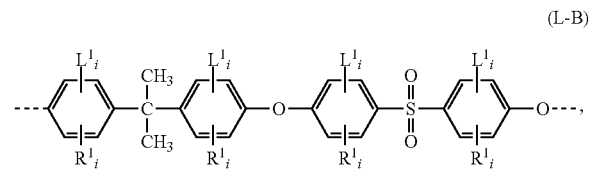

(L-A)

(L-B)

-continued
and

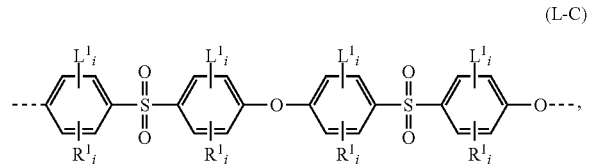

(L-C)

based on the total number of moles in the poly(aryl ethersulfone) (PAES) polymer.

7. The method of claim 1, wherein the poly(aryl ethersulfone) (PAES) polymer has a number average molecular weight (Mn) of less than about 20,000 g/mol, as measured by gel permeation chromatography (GPC) using methylene chloride as a mobile phase, with polystyrene standards.

8. The method of claim 1, wherein the poly(aryl ethersulfone) (PAES) polymer has a number average molecular weight (Mn) of no less than about 1,000 g/mol, as measured by gel permeation chromatography (GPC) using methylene chloride as a mobile phase, with polystyrene standards.

9. The method of claim 1, wherein the poly(aryl ethersulfone) (PAES) polymer has a number average molecular weight (Mn) of less than about 15,000 g/mol, as measured by gel permeation chromatography (GPC) using methylene chloride as a mobile phase, with polystyrene standards.

10. The method of claim 1, wherein the poly(aryl ethersulfone) (PAES) polymer has a number average molecular weight (Mn) of less than about 10,000 g/mol, as measured by gel permeation chromatography (GPC) using methylene chloride as a mobile phase, with polystyrene standards.

11. The method of claim 1, wherein the recurring units ($R^{PAES}$) are units of formula (L'):

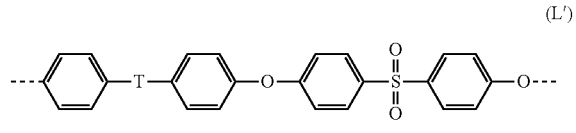

(L')

and/or at least one terminal group is according to formula (M'):

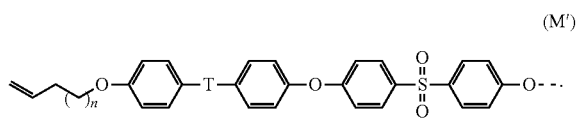

(M')

12. The method of claim 11, wherein T is selected from the group consisting of a bond, —SO$_2$— and —C(CH$_3$)$_2$—.

13. The method of claim 1, wherein the poly(arylethersulfone) (PAES) polymer comprises at least 95 mol. % of recurring units of formula (L) based on the total number of moles in the polymer.

14. The method of claim 1, wherein the poly(arylethersulfone) (PAES) polymer comprises at least 99 mol. % of recurring units of formula (L) based on the total number of moles in the polymer.

15. The method of claim 11, wherein the poly(arylethersulfone) (PAES) polymer comprises at least 95 mol. % of recurring units of formula (L') based on the total number of moles in the polymer.

16. The method of claim 11, wherein the poly(arylethersulfone) (PAES) polymer comprises at least 99 mol. % of recurring units of formula (L') based on the total number of moles in the polymer.

* * * * *